May 5, 1925.

K. W. BARTLETT 1,536,056

LIQUID TREATING APPARATUS

Filed Feb. 11, 1924   2 Sheets-Sheet 1

May 5, 1925.  1,536,056

K. W. BARTLETT

LIQUID TREATING APPARATUS

Filed Feb. 11, 1924  2 Sheets-Sheet 2

Inventor:
Kent W. Bartlett
By G. L. Gragg
Atty.

Patented May 5, 1925.

1,536,056

UNITED STATES PATENT OFFICE.

KENT W. BARTLETT, OF HAMMOND, INDIANA.

LIQUID-TREATING APPARATUS.

Application filed February 11, 1924. Serial No. 691,864.

*To all whom it may concern:*

Be it known that I, KENT W. BARTLETT, a citizen of the United States, residing at Hammond, in the county of Lake and the State of Indiana, have invented a certain new and useful Improvement in Liquid-Treating Apparatus, of which the following is a full, clear, concise, and exact description.

My invention relates to liquid treating apparatus and is of particular service in connection with water softening equipment.

The invention has for its object the provision of mechanism that will very accurately proportion chemical to the water or other liquid to be treated thereby. The mechanism which proportions the flow of chemical to the water is governed by the incoming raw water and to this end there is a riser into which the raw water is discharged on its way to the treatment chamber and settling tank.

Valving mechanism preferably controls the flow of a portion of the softened water, furnished by the apparatus, to mechanism that directly governs the flow of the chemical.

A stilling chamber is employed alongside the aforesaid raw water receiving riser and serves to convey the raw water from the riser to the treatment chamber and settling tank. The level of the raw water where it leaves the stilling chamber on its way to the treatment chamber varies according to the rate of flow of the raw water into the riser and from the riser into the stilling chamber. If the float that is provided in the riser for governing the flow of softened water to the chemical controlling mechanism were permitted to perform its function without regulation, error would be introduced owing to the variation of the level of the raw water where it is discharged into the treatment chamber. I therefore employ a supplemental float mechanism governed by the raw water that is passed to the stilling chamber and so related to the other float mechanism as to rectify the error irrespective of the levels attained by the raw water where it leaves the stilling chamber for the treatment chamber. In order that the raw water that is passed through the stilling chamber may control the supplemental float mechanism without being affected by the surging which may occur at the level of the raw water in the stilling chamber, I provide a supplemental stilling chamber which receives the raw water from the main stilling chamber and which contains the supplemental float mechanism.

Figure 1:
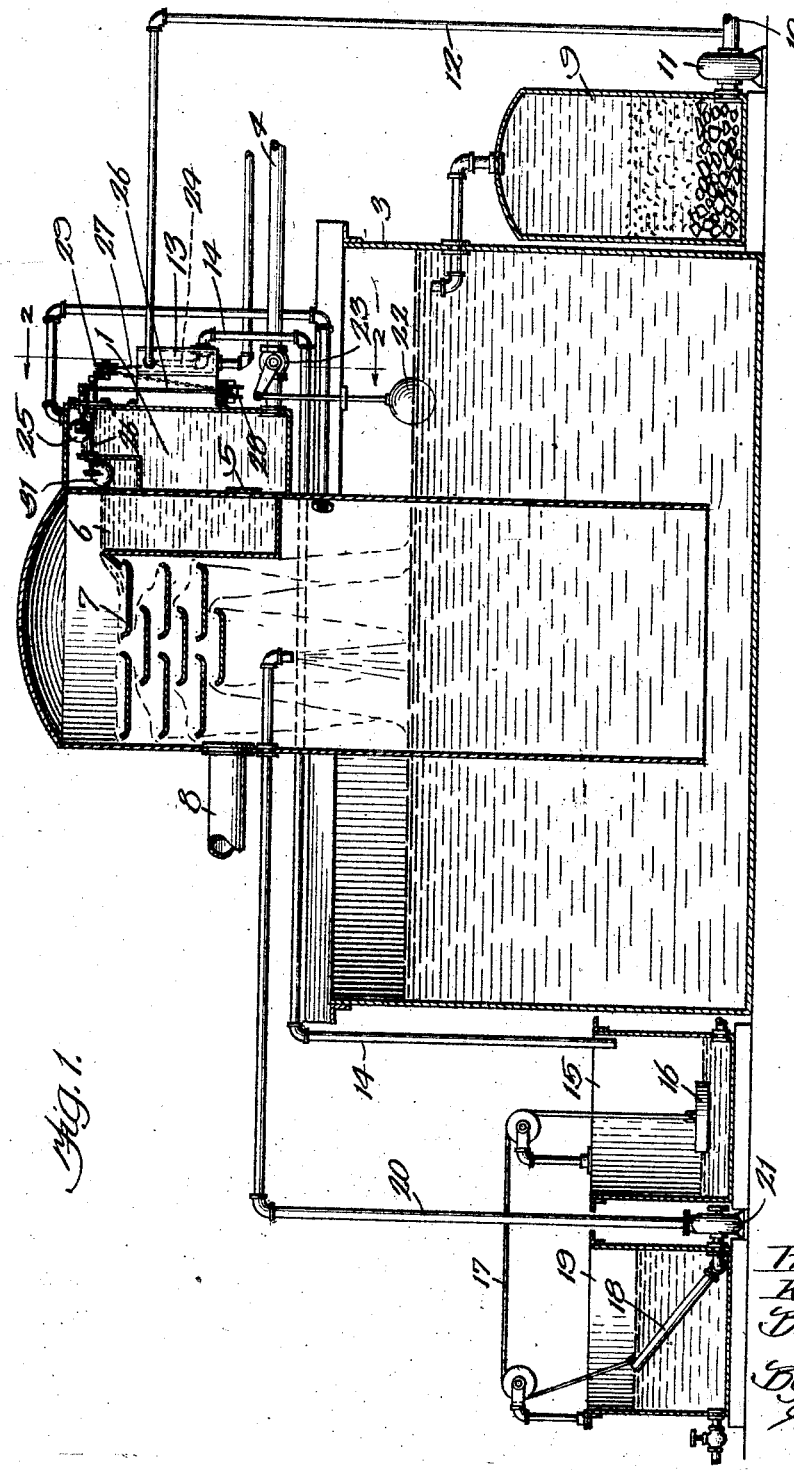
Figure 2:
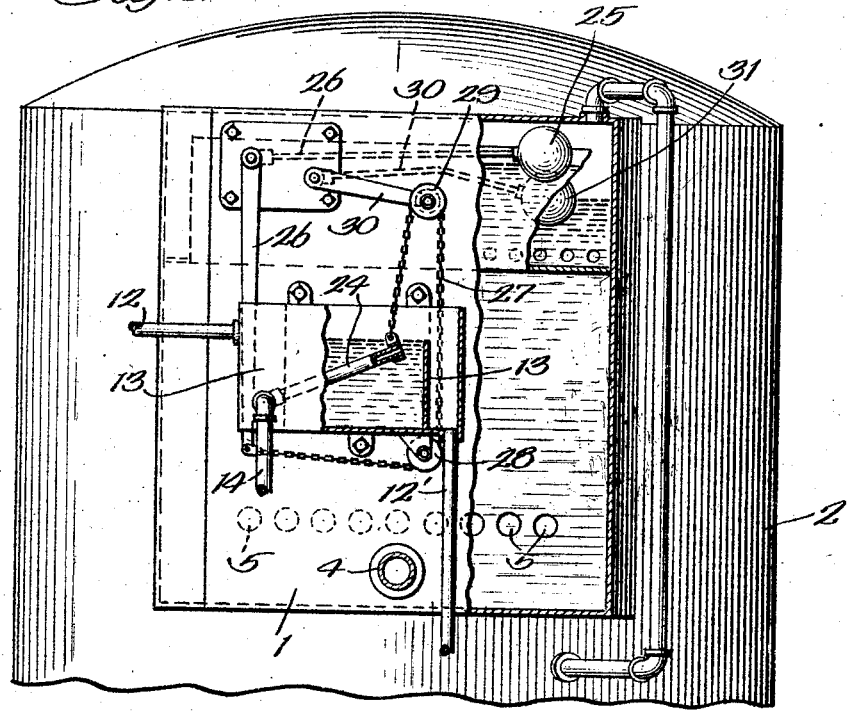
Figure 3:
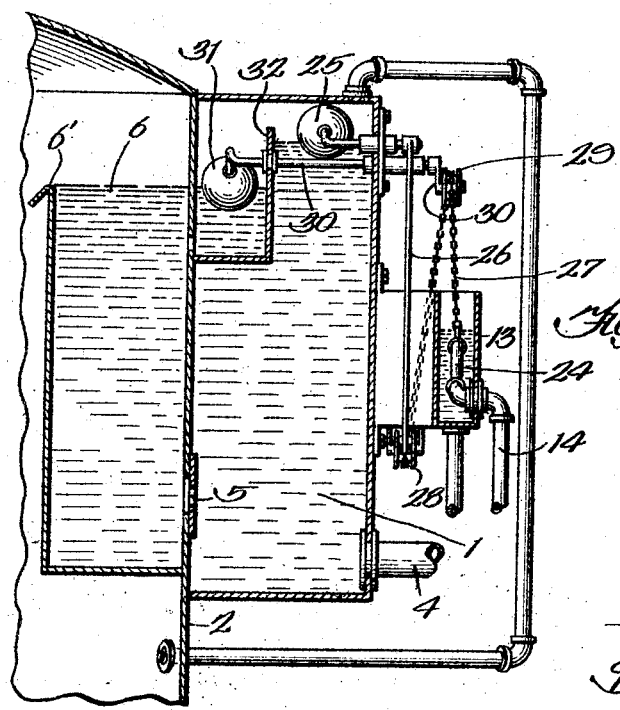

The invention will be more fully explained in connection with the accompanying drawings in which Fig. 1 is a vertical sectional view, somewhat diagrammatic, illustrating the preferred embodiment of the invention; Fig. 2 is a sectional view on line 2—2 of Fig. 1 with parts broken away; and Fig. 3 is a view on a larger scale of a part of the apparatus as it is illustrated in Fig. 1.

Like parts are indicated by similar characters of reference throughout the different figures.

The water softening or liquid treating apparatus illustrated includes a riser 1 upon the exterior of the treatment chamber 2 which is open at its bottom to communicate with the interior of the treatment or settling tank 3 into which chamber 2 projects. The water or other liquid to be chemically treated flows through the pipe 4 into the bottom of the riser 1 and flows through the series of openings 5 into the stilling chamber 6 that is located within the treatment chamber 2. The water flows over the rim of the stilling chamber upon the cascade of trays 7 if it is to be heated, heat being furnished by means of steam passing through the pipe 8 into the chamber 2 below the trays to reach the water which is subdivided by the trays to be more accessible to the steam.

The softened water is passed from the treatment or settling tank through the filtering tank 9 to the pipe 10 which conveys the softened water to its place or places of use. A pump 11 promotes the outflow of the softened water. A portion of the softened water is conveyed by the pipe 12 to the upper portion of the chemical control tank 13 from which the water is passed through the pipe 14 to the float tank 15. An excess of water is conveyed to the control tank, the surplus being discharged through the overflow pipe 12'. A float 16 is within this tank and has its height governed by the level of the liquid therein, this liquid level rising as the water is being supplied to the treatment tank. The float 16 is connected by means of a cable 17 with the swinging inclined outlet pipe 18, that is disposed in the chemical tank 19. As the float rises the pipe 18 is lowered to cause the maintenance of flow of chemical through the pipe 20 to the treatment tank which is proportional to the water being supplied for treatment. A pump 21 may be employed to maintain the proper flow of chemical.

The float 22 is desirably also employed, this float being immersed in the liquid in the treatment tank 3, this float being connected with the valve 23 in pipe 4. When sufficient treated water has been accumulated in the treatment tank the float 22 will rise to close the valve 23.

The softened water is caused to flow in proper proportion by a swinging outlet pipe 24 in the chemical control tank 13, the upper inlet end of this pipe being caused to rise (by mechanism to be explained) as the flow of incoming raw water is reduced at the valve 23, and being caused to lower when the flow of incoming raw water is increased. When the inlet end of pipe 24 rises the head of water above it in tank 13 lessens to reduce the flow of water through pipe 24, the converse being true when said pipe end lowers. Mechanism taking part in this adjustment of pipe 24 is inclusive of a float 25 in the riser 1, a bell crank 26 carrying the float 25 upon one end, a cable 27 attached at one end to the other end of the bell crank and at its other end to the inlet end of the inclined swinging pipe 24, and sheaves 28, 29 over which the cable passes. The pipe 24, thus constituting a valve, will lower of its own weight as the float 25 rises, and will be lifted by the cable as the float falls, the bell crank being suitably weighted for this purpose.

It will be observed that the positioning of the inlet end of the discharge pipe 24 depends upon the height of the water in the riser 1 upon which the float 25 rides. If this water and float are allowed to function without being controlled in functioning, error would be introduced owing to variation in the level of the water at the rim 6' of the stilling chamber over which the water flows into the treatment chamber. I therefore provide mechanism, governed by the raw water in the stilling chamber, which cooperates with the float in the riser in adjusting the position of the pipe 24. This cooperating mechanism is preferably inclusive of another bell crank lever 30 which carries the sheave 29 upon one end and a float 31 upon its other end that rides upon the raw water admitted to the supplemental stilling chamber 32 from the main stilling chamber 6 through the opening 33 that is preferably small in comparison to the opening 5, so that the raw water in the supplemental stilling chamber will not surge. An increase in the common level of the water in the two stilling chambers will cause the float 31 to rise and the sheave 29 to rise occasioning a raising of the sheave 29 to an extent which will so govern the pipe 24 as to prevent the error in the adjustment of said pipe that would otherwise occur if the pipe were adjusted alone by float 25. A decrease in the common level of the water in the two stilling chambers would be accompanied by a converse of the results arising upon an increase in this level. When the water rises in the riser it will rise somewhat in the stilling tank 6 and its extension or supplement 32. The float 25 will then lower the valve pipe 24, and the float 31 will exert a lifting effort upon said valve pipe to reduce slightly the extent to which it would otherwise be lowered by float 25. When the water is lowered in the riser and settling tank, the converse of the results above set forth ensues. Error at this part of the apparatus that would otherwise follow if the float 25 were not thus modified in its operation is thus eliminated.

It is obvious that changes may be made without departing from the spirit of my invention.

Having thus described my invention I claim as new and desire to secure by Letters Patent the following:—

1. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank receiving treated liquid from said apparatus and discharging into said float tank; valve mechanism in the control tank controlling the flow of liquid therefrom; a riser receiving the liquid that is to be treated; a float in said riser in controlling relation to the latter valve mechanism; a stilling chamber into which the riser discharges and discharging into the settling chamber; and a float governed by the level of the liquid in the stilling chamber and also in controlling relation to the valve mechanism in the control tank and serving partially to reduce the adjusting action of the float in the riser.

2. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank receiving treated liquid from said apparatus and discharging into said float tank; valve mechanism in the control tank controlling the flow of liquid therefrom; a riser receiving the liquid that is to be treated; a float in said riser in controlling relation to the latter valve mechanism; a stilling chamber into which the riser discharges and discharging into the settling chamber; a supplemental stilling chamber receiving a portion of the liquid from the other stilling chamber; and a float governed by the level of the liquid in the supplemental stilling chamber and also in controlling relation to the valve mechanism in the control tank and serving partially to reduce the adjusting action of the float in the riser.

3. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank receiving treated liquid from said apparatus and discharging into said float tank; valve mechanism in the control tank in the form of an inclined swinging pipe open at its upper end to receive liquid and discharging into the float tank; a riser receiving the liquid that is to be treated; a float in said riser; a bell crank having the float in the riser connected with one of its ends and its other end in controlling connection with the valve mechanism in the control tank; a stilling chamber into which the riser discharges and discharging into the settling chamber; and a float governed by the level of the liquid in the stilling chamber; and a bell crank having the float governed by the liquid in the stilling chamber connected with one of its ends and its other end connected with the valve mechanism in the control tank reversely to the connection of the float in the riser with this valve mechanism partially to reduce the adjusting action of the float in the riser.

4. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank receiving treated liquid from said apparatus and discharging into said float tank; valve mechanism in the control tank in the form of an inclined swinging pipe open at its upper end to receive liquid and discharging into the float tank; a riser receiving the liquid that is to be treated; a float in said riser; a bell crank having the float in the riser connected with one of its ends and its other end in controlling connection with the valve mechanism in the control tank; a stilling chamber into which the riser discharges and discharging into the settling chamber; a supplemental stilling chamber receiving a portion of the liquid from the other stilling chamber; and a float governed by the level of the liquid in the stilling chamber; and a bell crank having the float governed by the liquid in the stilling chamber connected with one of its ends and its other end connected with the valve mechanism in the control tank reversely to the connection of the float in the riser with this valve mechanism partially to reduce the adjusting action of the float in the riser.

5. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank discharging into said float tank; valve mechanism in the control tank controlling the flow of liquid therefrom; a riser receiving the liquid that is to be treated; a float in said riser in controlling relation to the latter valve mechanism; a stilling chamber into which the riser discharges and discharging into the settling chamber; and a float governed by the level of the liquid in the stilling chamber and also in controlling relation to the valve mechanism in the control tank and serving partially to reduce the adjusting action of the float in the riser.

6. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank discharging into said float tank; valve mechanism in the control tank controlling the flow of liquid therefrom; a riser receiving the liquid that is to be treated; a float in said riser in controlling relation to the latter valve mechanism; a stilling chamber into which the riser discharges and discharging into the settling chamber; a supplemental stilling chamber receiving a portion of the liquid from the other stilling chamber; and a float governed by the level of the liquid in the supplemental stilling chamber and also in controlling relation to the valve mechanism in the control tank and serving partially to reduce the adjusting action of the float in the riser.

7. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank discharging into said float tank; valve mechanism in the control tank in the form of an inclined swinging pipe open at its upper end to receive liquid and discharging into the float tank; a riser receiving the liquid that is to be treated; a float in said riser; a bell crank having the float in the riser connected with one of its ends and its other end in controlling connection with the valve mechanism in the control tank; a stilling chamber into which the riser discharges and discharging into the settling chamber; a float governed by the level of the liquid in the stilling chamber; and a bell crank having the float governed by the liquid in the stilling chamber connected with one of its ends and its other end connected with the valve mechanism in the control tank reversely to the connection of the float in the riser with this valve mechanism partially to reduce the adjusting action of the float in the riser.

8. Liquid treating apparatus including a treatment chamber; a source of chemical discharging into the treatment chamber; valve mechanism for controlling the flow of chemical to the treatment chamber; a float tank containing a float in controlling relation to said valve mechanism; a control tank discharging into said float tank; valve mechanism in the control tank in the form of an inclined swinging pipe open at its upper end to receive liquid and discharging into the float tank; a riser receiving the liquid that is to be treated; a float in said riser; a bell crank having the float in the riser connected with one of its ends and its other end in controlling connection with the valve mechanism in the control tank; a stilling chamber into which the riser discharges and discharging into the settling chamber; a supplemental stilling chamber receiving a portion of the liquid from the other stilling chamber; a float governed by the level of the liquid in the stilling chamber; and a bell crank having the float governed by the liquid in the stilling chamber connected with one of its ends and its other end connected with the valve mechanism in the control tank reversely to the connection of the float in the riser with this valve mechanism partially to reduce the adjusting action of the float in the riser.

In witness whereof, I hereunto subscribe my name.

KENT W. BARTLETT.